US012667992B2

(12) United States Patent
Yamaoka et al.

(10) Patent No.: US 12,667,992 B2
(45) Date of Patent: Jun. 30, 2026

(54) CHAIN SAW

(71) Applicant: Nanjing Chervon Industry Co., Ltd., Nanjing (CN)

(72) Inventors: Toshinari Yamaoka, Nanjing (CN); Xuan Xu, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 310 days.

(21) Appl. No.: 18/172,759

(22) Filed: Feb. 22, 2023

(65) Prior Publication Data

US 2023/0191646 A1 Jun. 22, 2023

Related U.S. Application Data

(63) Continuation of application No. PCT/CN2021/115610, filed on Aug. 31, 2021.

(30) Foreign Application Priority Data

Sep. 2, 2020 (CN) ......................... 202010907199.1
Sep. 2, 2020 (CN) ......................... 202021892478.7

(51) Int. Cl.
*B27B 17/08* (2006.01)
*B27B 17/00* (2006.01)
(Continued)

(52) U.S. Cl.
CPC .............. *B27B 17/08* (2013.01); *B27B 17/02* (2013.01); *B27B 17/12* (2013.01); *B27B 17/0008* (2013.01)

(58) Field of Classification Search
CPC ...... B23D 57/02; B23D 57/023; A01G 3/086; A01G 23/091; B25F 5/001
See application file for complete search history.

(56) References Cited

U.S. PATENT DOCUMENTS

2010/0218386 A1* 9/2010 Roßkamp ............... B27B 17/08 30/277.4
2011/0078910 A1* 4/2011 Tomita ...................... H02P 3/22 173/217

(Continued)

FOREIGN PATENT DOCUMENTS

CN 111376351 A 7/2020
CN 211090786 U 7/2020

(Continued)

OTHER PUBLICATIONS

Advanced PCB, Benefits of Printed Circuit Boards, Mar. 13, 2020, obtained from https://www.advancedpcb.com/en-us/blog/benefits-of-printed-circuit-boards/ on Apr. 28, 2025 (Year: 2020).*

(Continued)

*Primary Examiner* — Evan H MacFarlane
(74) *Attorney, Agent, or Firm* — Greenberg Traurig, LLP

(57) ABSTRACT

A chain saw includes a housing, an electric motor, a transmission system, a control system including a circuit board assembly, and a power supply assembly. The circuit board assembly obliquely intersects with a first straight line; in a direction of a second straight line perpendicular to a direction of the first straight line and extending along an up and down direction, the electric motor has a projection surface and the circuit board assembly has a projection surface, the projection surface of the electric motor at least partially overlaps the projection surface of the circuit board assembly. In the direction of the first straight line, the power supply assembly has a projection surface and the circuit board assembly has a projection surface, and the projection surface of the power supply assembly at least partially overlaps the projection surface of the circuit board assembly.

15 Claims, 8 Drawing Sheets

(51) Int. Cl.
*B27B 17/02* (2006.01)
*B27B 17/12* (2006.01)

(56) References Cited

U.S. PATENT DOCUMENTS

| | | | | |
|---|---|---|---|---|
| 2014/0054054 | A1* | 2/2014 | Osborne | B25F 5/00 173/217 |
| 2020/0078876 | A1* | 3/2020 | Okouchi | B25F 5/02 |
| 2021/0046632 | A1* | 2/2021 | Osawa | B01D 46/0004 |

FOREIGN PATENT DOCUMENTS

| | | | |
|---|---|---|---|
| CN | 211362617 | U | 8/2020 |
| CN | 211387163 | U | 9/2020 |
| CN | 213471505 | U | 6/2021 |
| JP | 2019171660 | A | 10/2019 |

OTHER PUBLICATIONS

ALLPCB, How can the thermal dissipation be achieved for cooling?, Jun. 9, 2017, obtained from https://www.allpcb.com/pcb_design/thermal_dissipation.html on Apr. 28, 2025 (Year: 2017).*

Screen capture showing Jun. 9, 2017 publication date for ALLPCB 'How can the termal dissipation be achieved for cooling'?, obtained from https://web.archive.org/web/20170609223434/https://www.allpcb.com/pcb_design/thermal_dissipation.html on Apr. 28, 2025.*

Screen captures and audio transcript from YouTube video clip entitled "Old video: Chainsaw/Buzz Cut Knife from Bladeshow 2014," 13 pages, uploaded on Oct. 7, 2020, by user "thenextarcher". Retrained from internet: https://www.youtube.com/watch?v=ZH82KfKeRoc on Apr. 25, 2025.*

ISA/CN, English translation of Int. Search Report issued on PCT application No. PCT/CN2021/115610, dated Nov. 22, 2021, 2 pages.

ISA/CN, Int. Search Report issued on PCT application No. PCT/CN2021/115610, dated Nov. 22, 2021, 3 pages.

ISA/CN, English translation of Written Opinion issued on PCT application No. PCT/CN2021/115610, dated Nov. 22, 2021, 3 pages.

ISA/CN, Written Opinion issued on PCT application No. PCT/CN2021/115610, dated Nov. 22, 2021, 4 pages.

* cited by examiner

CHAIN SAW

RELATED APPLICATION INFORMATION

This application is a continuation of International Application Number PCT/CN2021/115610, filed on Aug. 31, 2021, through which this application also claims the benefit under 35 U.S.C. § 119(a) of Chinese Patent Application No. 202010907199.1, filed on Sep. 2, 2020, and Chinese Patent Application No. 202021892478.7, filed on Sep. 2, 2020, which applications are incorporated herein by reference in their entirety.

BACKGROUND

As a garden tool, a chain saw can be operated by a user to cut workpieces. For the chain saw, a chain is driven by an electric motor to rotate to cut a workpiece such as wood. To satisfy power output, the chain saw generally includes components such as an electric motor which can output relatively high power, a transmission mechanism, an oil can, and a power supply. When the preceding components are mounted in a housing, the chain saw is caused to occupy a relatively large space and the whole machine is relatively bulky, which brings relatively great tiredness to the user operating for a long time. When operating the chain saw, the user is continuously in adjusted positions. In this case, the chain saw needs to be stored or connected to a strap or another connector. Moreover, since the chain saw is hung or stored on the user, a relatively large volume has a relatively great influence on the movement of the user.

SUMMARY

A chain saw includes a housing, an electric motor, a transmission system, a control system, and a power supply assembly. The housing extends substantially along a front and rear direction and is formed with an accommodation space. The electric motor is at least partially disposed in the accommodation space. The transmission system is connected to the electric motor and capable of outputting a driving force. The control system includes a circuit board assembly extending in a plane. The power supply assembly is disposed on a rear side of the housing and used for powering the electric motor. The circuit board assembly obliquely intersects with a first straight line extending along the front and rear direction; in a direction of a second straight line perpendicular to a direction of the first straight line and extending along an up and down direction, the electric motor has a projection surface along the direction of the second straight line, where the projection surface is perpendicular to the direction of the second straight line, and the circuit board assembly has a projection surface along the direction of the second straight line, where the projection surface is perpendicular to the direction of the second straight line; and the projection surface of the electric motor along the direction of the second straight line at least partially overlaps the projection surface of the circuit board assembly along the direction of the second straight line. The power supply assembly has a projection surface along the direction of the first straight line, where the projection surface is perpendicular to the direction of the first straight line, and the circuit board assembly has a projection surface along the direction of the first straight line, where the projection surface is perpendicular to the direction of the first straight line; and the projection surface of the power supply assembly along the direction of the first straight line at least partially overlaps the projection surface of the circuit board assembly along the direction of the first straight line.

In an example, the transmission system has a projection surface along the direction of the second straight line, where the projection surface is perpendicular to the direction of the second straight line, and the circuit board assembly has the projection surface along the direction of the second straight line, where the projection surface is perpendicular to the direction of the second straight line; and the projection surface of the transmission system along the direction of the second straight line at least partially overlaps the projection surface of the circuit board assembly along the direction of the second straight line.

In an example, the electric motor is an external rotor electric motor, and a ratio of a mass of the electric motor to a mass of the chain saw is greater than or equal to 0.07 and less than or equal to 0.4.

In an example, an oil pumping system which includes an oil can is further included, where the housing is formed with an opening communicating with an outside along both the front and rear direction and a left and right direction, and the oil can is disposed in the accommodation space and seals at least part of the opening.

In an example, the oil pumping system, the transmission system, the control system, the electric motor, and the power supply assembly are sequentially arranged along the front and rear direction.

In an example, the housing further includes an air inlet and an air outlet, where when the chain saw is running, a heat dissipation air path flowing in from the air inlet and flowing out from the air outlet is capable of being formed, and the heat dissipation air path is capable of flowing through the transmission system and the control system simultaneously.

In an example, the air outlet is configured to have a first blowing direction in which air is capable of being blown forward and a second blowing direction in which the air is capable of being blown backward.

In an example, a guide plate connected to the housing and a chain distributed around the guide plate are further included, where the transmission system includes a drive shaft capable of driving the chain to rotate; the chain saw further includes a cover plate capable of sealing at least part of the guide plate and at least part of the chain, where the cover plate and the housing are connected to each other and form a chip discharge space, and the drive shaft is at least partially disposed in the chip discharge space; and the electric motor includes an electric motor shaft disposed away from the chip discharge space.

In an example, the transmission system includes a gearbox distributed along the front and rear direction, where the electric motor and an output shaft are disposed on the same side of the gearbox.

In an example, a length of the chain saw in the front and rear direction is less than or equal to 330 mm, and a width of the chain saw in a left and right direction is less than or equal to 150 mm.

An example provides a chain saw. The chain saw includes a housing, an electric motor, a transmission system, a control system, and a power supply assembly. The housing extends substantially along a front and rear direction and is formed with an accommodation space. The electric motor is at least partially disposed in the accommodation space. The transmission system is connected to the electric motor and capable of outputting a driving force. The control system includes a circuit board assembly extending in a plane. The power supply assembly is disposed on a rear side of the housing and used for powering the electric motor. The circuit board assembly obliquely intersects with a first straight line extending along the front and rear direction; in a direction of a second straight line perpendicular to a direction of the first straight line and extending along an up and down direction, the electric motor has a projection surface along the direction of the second straight line, where the projection surface is perpendicular to the direction of the second straight line, and the circuit board assembly has a projection surface along the direction of the second straight line, where the projection surface is perpendicular to the direction of the second straight line; and the projection surface of the electric motor along the direction of the second straight line at least partially overlaps the projection surface of the circuit board assembly along the direction of the second straight line. The power supply assembly has a projection surface along the direction of the first straight line, where the projection surface is perpendicular to the direction of the first straight line, and the circuit board assembly has a projection surface along the direction of the first straight line, where the projection surface is perpendicular to the direction of the first straight line; and the projection surface of the power supply assembly along the direction of the first straight line at least partially overlaps the projection surface of the circuit board assembly along the direction of the first straight line. The housing further includes a lower bottom surface perpendicular to the up and down direction, the lower bottom surface extends substantially in a plane, and the housing is further recessed away from the lower bottom surface so that a hook is formed, where the hook is disposed in a range of a space between the lower bottom surface and the housing.

In an example, the housing is further formed with a recess in which the hook is at least partially disposed.

In an example, the chain saw further includes a guide plate mounted to the housing and a chain mounted to the guide plate and configured to rotate around the guide plate, where the hook is disposed toward a front end where the chain is disposed.

In an example, the housing is formed with a coupling portion to which the power supply assembly is mounted; and the housing is further formed with a guide slot guiding the power supply assembly to be mounted to the coupling portion.

In an example, the guide slot extends along a left and right direction perpendicular to the front and rear direction, and the power supply assembly is mounted to the coupling portion from a left side of the housing or the rear side of the housing.

In an example, the housing includes a first housing and a second housing, and the guide slot is disposed on the first housing or the second housing.

In an example, the housing includes a first housing and a second housing, and the guide slot is disposed on both the first housing and the second housing.

In an example, the housing is connected to or formed with 2 to 6 protection panels which form an accommodation cavity for protecting the power supply assembly.

In an example, the housing is formed with or connected with a main handle, and a center of gravity of a whole machine of the chain saw is located substantially near the main handle in the front and rear direction.

In an example, the housing includes a first housing and a second housing, where the first housing and the second housing are substantially symmetrical and are connected to each other to form the housing, and a center of gravity of the chain saw is located at a joint of the first housing and the second housing.

DETAILED DESCRIPTION

Figure 1:
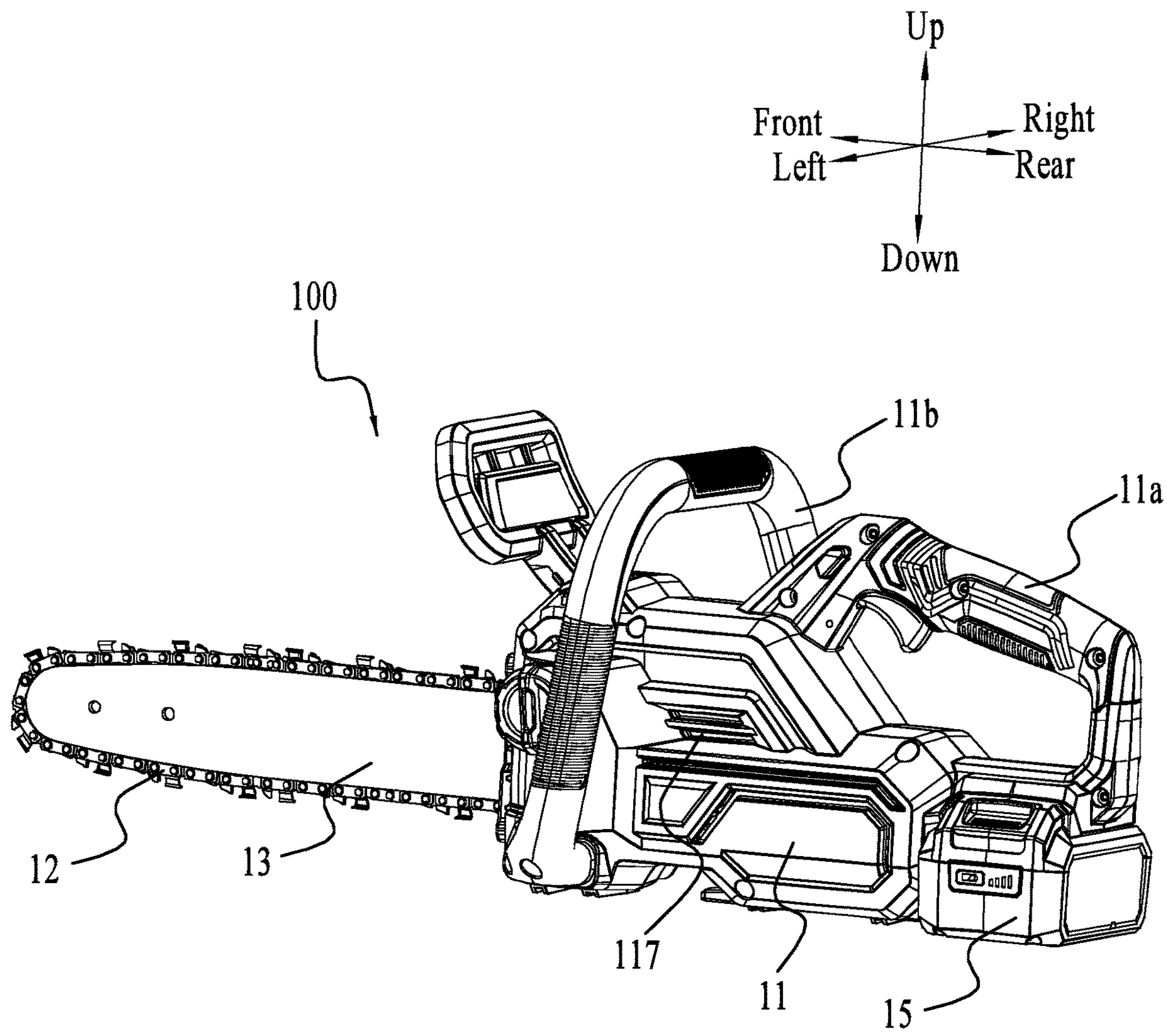
FIG. 1 is a perspective view of a chain saw according to an example.
Figure 2:
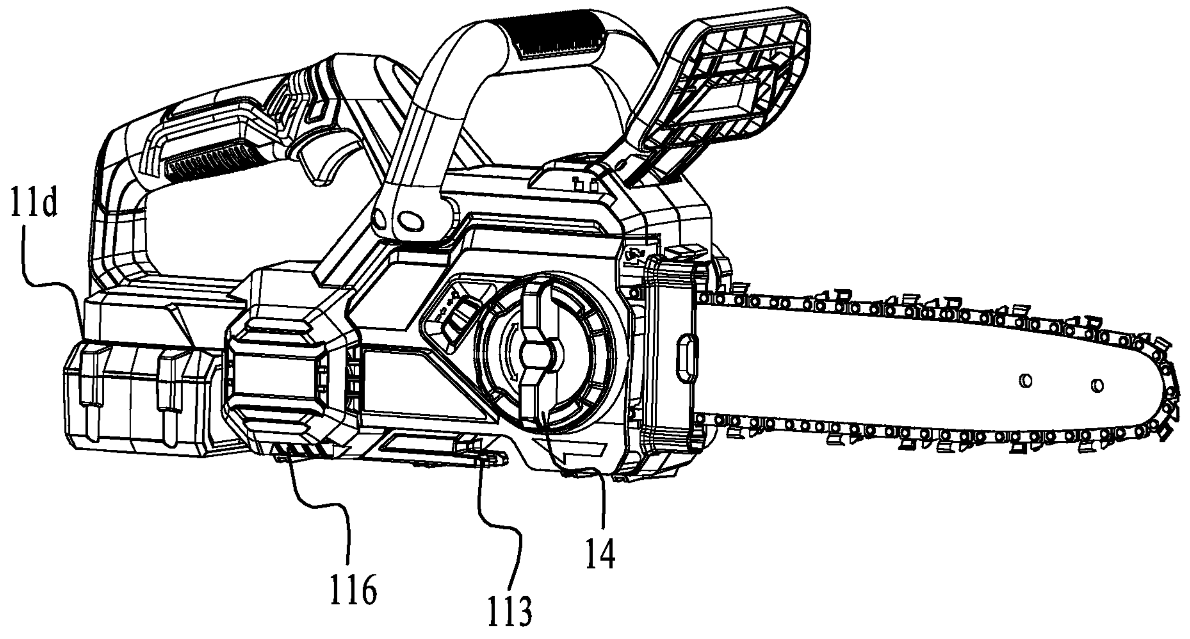
FIG. 2 is a perspective view of the chain saw in FIG. 1 from another angle of view.

A chain saw 100 as shown in FIGS. 1 and 2 includes a housing 11, a chain 12, a guide plate 13, a locking mechanism 14, and a power supply assembly 15. The guide plate 13 is configured to guide the chain 12, and the chain 12 rotates around the guide plate 13. A locking device is mounted to a joint of the guide plate 13 and the housing 11 and is detachably coupled to the housing 11. The locking device is configured to fix the guide plate 13 and tension the chain 12. The power supply assembly 15 is connected to the housing to power the chain saw 100. In an example, the housing 11 is formed with a coupling portion 11*d* connected to the chain saw 100, and the power supply assembly 15 is mounted to the coupling portion 11*d*. The housing 11 is further formed with or connected to a main handle 11*a* and further formed with or connected to an auxiliary handle 11*b* on a front side of the main handle 11*a*. The main handle 11*a* includes a main grip for a user to hold, and the auxiliary handle 11*b* is provided with an auxiliary grip for the user to hold. The main handle 11*a* is connected to a control system 19 for the user to control power output of the chain saw 100. The auxiliary handle 11*b* is carried by the user, so as to cooperate with the main handle 11*a* for the operation of the chain saw 100.

As shown in FIG. 1, directions including “up”, “down”, “front”, “rear”, “left”, and “right” are defined. The guide plate 13 is distributed substantially along a front and rear direction. The main handle 11*a* is disposed on a rear side of the housing, the auxiliary handle 11*b* is disposed on the front side of the main handle 11*a*, and both the main handle 11*a* and the auxiliary handle 11*b* are disposed on an upper side of the housing. A shield is disposed on a front side of the auxiliary handle 11*b* and used for protecting the user from being cut by the chain 12 under the action of recoil when the chain saw 100 is operated.

As shown in FIGS. 3 to 6, the chain saw 100 further includes an oil pumping system 16, a brake system, a transmission system 17, and a power system 18, where the oil pumping system 16, the brake system, the transmission system 17, the control system 19, the power system 18, and the power supply assembly 15 are sequentially disposed in the front and rear direction. In fact, the housing 11 is formed with a first accommodation space 111, where the oil pumping system 16, the brake system, the transmission system 17, the control system 19, and the power system 18 are at least partially disposed in the first accommodation space 111. In an example, the oil pumping system 16 is disposed in the front side of the housing 11, the power supply assembly 15 is disposed on the rear side of the housing 11, and the transmission system 17 and the power system 18 are disposed between the oil pumping system 16 and the power supply assembly 15. With such a design, a width of a whole machine of the chain saw 100 in a left and right direction can be set to 150 mm or less. In other examples, the width of the whole machine of the chain saw 100 in the left and right direction can be set to 127 mm or less. In addition, with the preceding arrangement, a length L of the whole machine of the chain saw 100 in the front and rear direction can be set to 330 mm or less. In an example, the length L of the whole machine of the chain saw 100 in the front and rear direction can be set to 305 mm or less. Thus, the whole machine of the chain saw 100 is very compact and has a lighter structure, which is convenient to operate and use.

Figure 7:
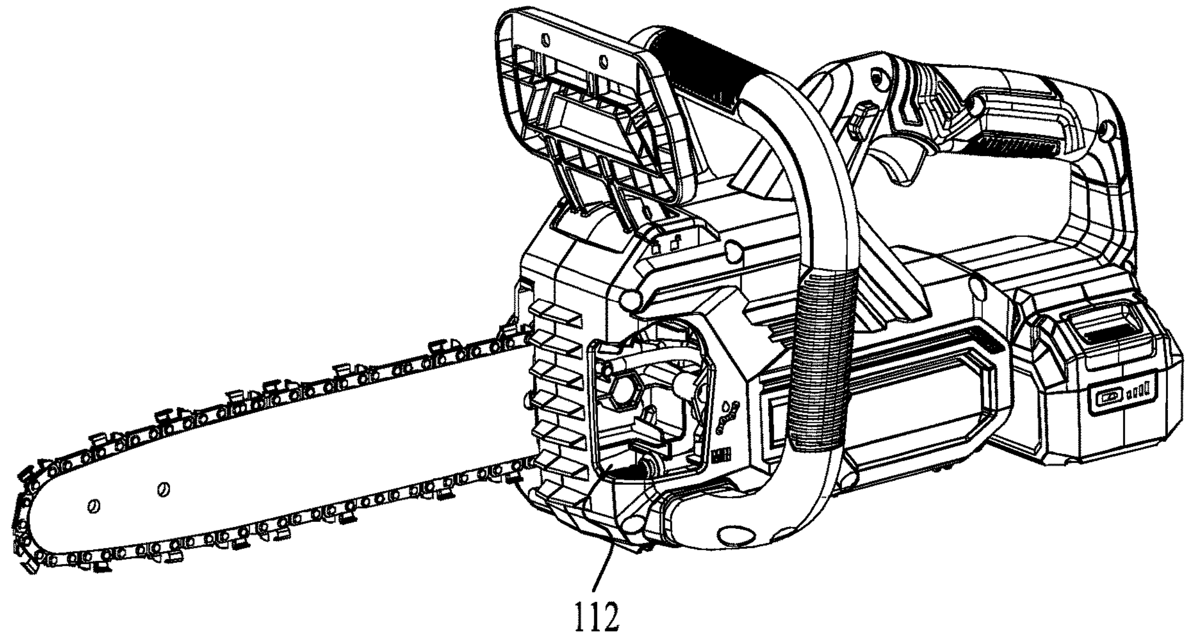
FIG. 7 is a perspective view of the chain saw in FIG. 1 with an oil can removed.

As shown in FIG. 7, the oil pumping system 16 includes an oil can 161 and an oil pump, where the oil pump is configured to connect the transmission system 17 to the oil can 161 and pump oil in the oil can 161 to the guide plate 13 of the chain saw 100 or the chain 12 of the chain saw 100. In an example, a portion of the housing 11 where a front side of the housing 11 is connected to a right side of the housing 11 is provided with an opening 112, and the oil can 161 is disposed in the housing 11 and at least seals the opening 112. The opening 112 is configured to communicate with the outside in the front and rear direction of the housing 11 and the left and right direction of the housing 11 separately so that the oil can 161 disposed therein can be observed in both the front and rear direction and the left and right direction. In fact, four quadrants are included in a Cartesian coordinate system formed through the intersection of the front and rear direction with the left and right direction, the opening 112 is disposed in one of the four quadrants, and the oil can 161 can be observed in a range of 90° in the quadrant where the opening 112 is located. In addition, in an up and down direction, the oil can 161 is also exposed in the range of 90° of the quadrant where the opening 112 is located. Thus, the amount of oil in the oil can 161 is exposed on the front and right sides in a field of view that can be observed so that the oil can 161 has a better visual effect. In fact, no matter when the chain saw 100 is operated or the chain saw 10 is placed, the amount of oil in the oil can 161 can be easily observed so that the operation experience of the chain saw 100 is greatly optimized and the user does not need to shut down the chain saw 100 or deliberately seek a visual angle to observe the amount of oil in the oil can 161. With this arrangement, a window of the oil can 161 becomes larger so that the user more easily observes the position of an oil level in the oil can 161.

Figure 3:
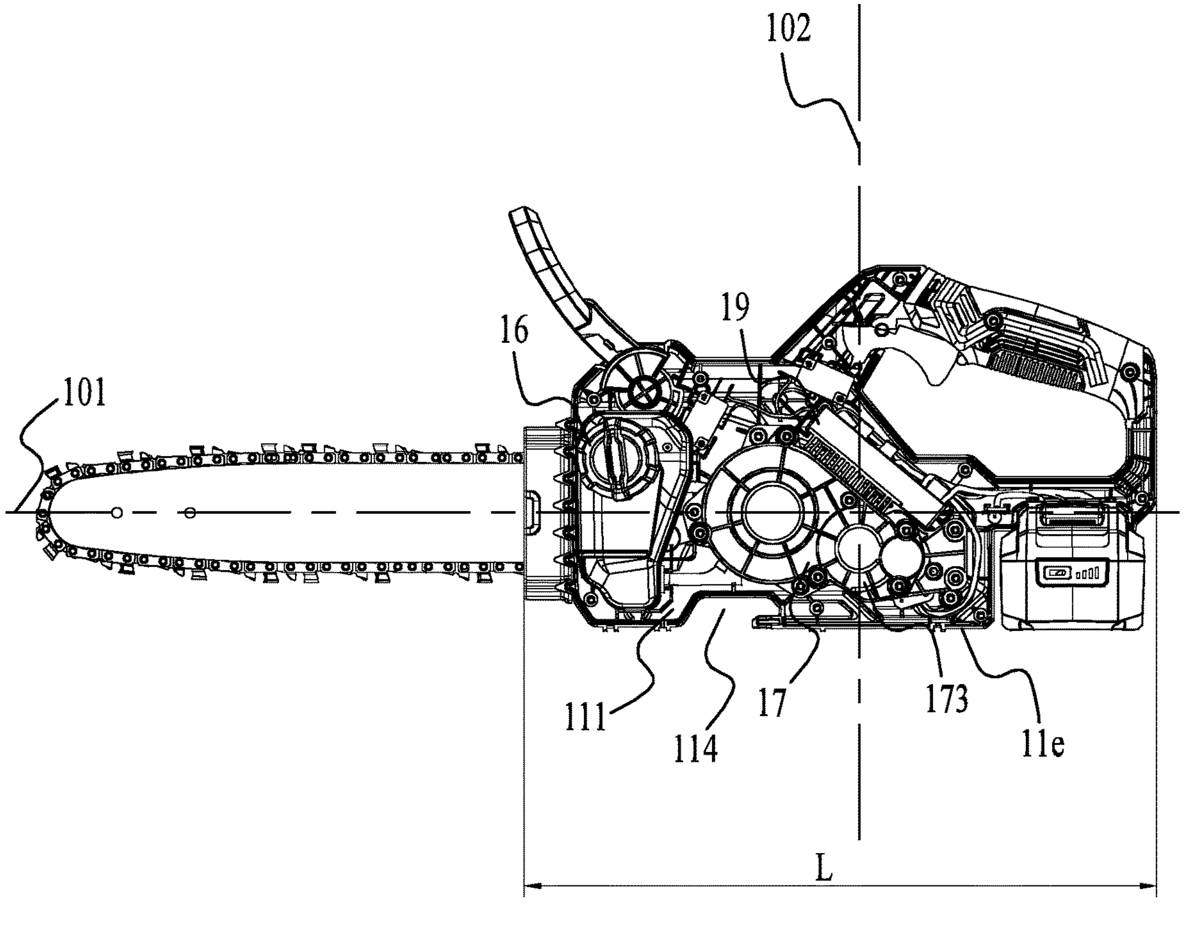
FIG. 3 is a sectional view of the chain saw in FIG. 1.

As shown in FIGS. 1 to 3, the housing 11 is further connected to or formed with a hook 113 configured to allow the chain saw 100 to be hung up. In an example, the housing 11 includes a lower bottom surface **11*e* extending in a plane perpendicular to the up and down direction. In the up and down direction, the housing 11 further includes a recess 114 which is recessed upward from the lower bottom surface 11*e*, and the recess 114 is also recessed backward at a position away from the lower bottom surface 11*e* so that the housing 11 forms the hook 113. In addition, the hook 113 is disposed toward a front side where the chain 12 is disposed so that when the chain saw 100 is hung, the chain 12 is downward and the housing 11 is upward. Thus, when the chain saw 100 falls because of misoperation or the like, the housing 11 can be away from the ground, thereby avoiding damage to the housing 11. In this example, on the one hand, the hook 113 is formed by the housing so that an additional mounting opening or mounting accessory is avoided; and on the other hand, the hook 113 is disposed above the plane where the lower bottom surface 11*e* is located so that the hook 113 does not protrude from the lower bottom surface 11*e* of the whole machine of the chain saw 100, thereby avoiding an increase of the dimension of the whole machine of the chain saw 100 in the up and down direction and making the whole machine of the chain saw 100** more compact.

As shown in FIGS. 3 to 6, in this example, the power system 18 includes an electric motor 181 which is specifically configured to be an external rotor electric motor 181. An electric motor 181 with a small volume and a high energy/power density is used as the external rotor electric motor 181, where a rotational speed of the external rotor electric motor 181 is set to be greater than or equal to 18000 r/min and less than or equal to 45000 r/min. In an example, the rotational speed of the external rotor electric motor 181 is set to be greater than or equal to 26000 r/min and less than or equal to 35000 r/min. In this example, a mass of the external rotor electric motor 181 is set to be greater than or equal to 0.16 kg and less than or equal to 0.65 kg, and a mass of the whole machine of the chain saw 100 without the power supply assembly 15 is set to be greater than or equal to 2.0 kg and less than or equal to 4 kg. A ratio of the mass of the external rotor electric motor 181 to the mass of the whole machine of the chain saw 100 is greater than or equal to 0.07 and less than or equal to 0.4. Such an electric motor 181 is provided, which can effectively reduce the space occupied by the electric motor 181 in the first accommodation space 111 and can reduce the dimension of the whole machine of the chain saw 100 on the one hand and can also ensure that the chain saw 100 has relatively high power output and relatively high cutting efficiency on the other hand. In an example, the transmission system 17 includes an output shaft 171 and a three-stage gear 172 for transmission. The three-stage gear 172 includes a first-stage gear **172*a*, a second-stage gear 172*b*, and a third-stage gear 172*c*, where the output shaft 171 is connected to the first-stage gear 172*a* (i.e., a first gear), an electric motor shaft 181*a* is connected to the third-stage gear 172*c* (i.e., a second gear), and the second-stage gear 172*b* is connected to the first-stage gear 172*a* and the third-stage gear 172*c*. The three-stage gear 172 is configured for transmission so that a distance between the electric motor shaft 181*a* and a drive shaft configured to drive the chain 12 to rotate can be effectively increased, thereby causing the electric motor shaft 181*a* to be away from a chip discharge space 142 of the chain saw 100. The transmission system 17 may be provided with a two-stage gear or a multi-stage gear for the transmission. In an example, the locking device further includes a cover plate 141 sealing at least part of the chain 12 and at least part of the guide plate 13. The drive shaft protrudes from the first accommodation space 111 of the housing 11, a driving wheel is disposed on the drive shaft, and the chain 12 is engaged with the driving wheel and can be driven by the driving wheel to rotate around the guide plate 13. When cutting a workpiece, the chain 12 generates many chips, and part of the chips rotate along with the chain 12 to the vicinity of the driving wheel and fall in the vicinity of the driving wheel. When sealing at least part of the chain 12 and at least part of the guide plate 13, the cover plate 141 mates with the housing 11 to form the chip discharge space 142. The chip discharge space 142 occupies most of the space of the cover plate 141 in the front and rear direction. The chip discharge space 142 is formed with a chip discharge opening 143 downward so that the chips which rotate along with the chain 12 to the vicinity of the driving wheel fall out of the chip discharge space 142. To make the chip discharge space 142 larger, the chip discharge opening 143 wider, and a chip discharge effect better and to prevent the chain saw 100 from being locked, the electric motor shaft 181***a* is disposed, in the front and rear direction, on the rear side away from the chip discharge space 142. In addition, the three-stage gear 172 performs the transmission so that the space of the housing 11 occupied by the transmission system 17 in the left and right direction is also reduced. Thus, the transmission system 17 can be effectively prevented from occupying the chip discharge space 142 in the left and right direction so that on the premise that the chain saw 100 has the same volume and relatively high output power, the chip discharge space 142 can be configured to be relatively large and have a better chip discharge effect. In an example, the transmission system 17 includes a gearbox 173 configured to accommodate at least part of the three-stage gear 172 and distributed substantially along the front and rear direction. In the left and right direction, the electric motor 181 and the output shaft 171 are both disposed on the same side of the gearbox 173. In this example, the electric motor 181 and the output shaft 171 are both disposed on a right side of the gearbox 173. In a direction of a preset straight line passing through the up and down direction, a lowermost side of the output shaft 171 in the up and down direction includes a first plane perpendicular to the direction of the preset straight line, and an uppermost side of the electric motor shaft 181*a* in the up and down direction includes a second plane perpendicular to the direction of the preset straight line. The first plane is located above the second plane, that is, the electric motor shaft 181*a* and the output shaft 171 are also staggered in the up and down direction and are located in two planes so that the electric motor 181 can be further away from the chip discharge space 142.

The rear side of the housing 11 protrudes rightward so that a second accommodation space 115 is formed, where the electric motor 181 is disposed in the second accommodation space 115. The first accommodation space 111 and the second accommodation space 115 at least partially communicate with each other. In an example, a right end face of the electric motor 181 is disposed on a right side of the chain 12 and the guide plate 13. With this arrangement, on the one hand, the electric motor 181 can occupy less of the second accommodation space on the left side, and when the cover plate 141 is mounted to the housing, it can be ensured that the cover plate 141 and the housing 11 are substantially in the same flush position in the front and rear direction.

As shown in FIG. 2, part of the housing 11 forming the second accommodation space 115 further includes a movable air outlet 116. The air outlet 116 is disposed on an outer surface of the housing 11. The air outlet 116 is configured to be rotatable or retractable in a preset direction so that a blowing direction of cooling air of the electric motor 181 is adjusted. In an example, the air outlet 116 includes a first blowing direction and a second blowing direction. When the air outlet 116 is adjusted to the first blowing direction, the air can be blown forward via the air outlet 116 so that the chips discharged from the chip discharge opening 143 can be blown forward, thereby preventing the chips from falling on the user. When the air outlet 116 is adjusted to the second blowing direction, the air can be blown backward via the air outlet 116, thereby blowing on the power supply assembly 15 disposed on the rear side of the housing 11 to cool the power supply assembly 15.

Figure 4:
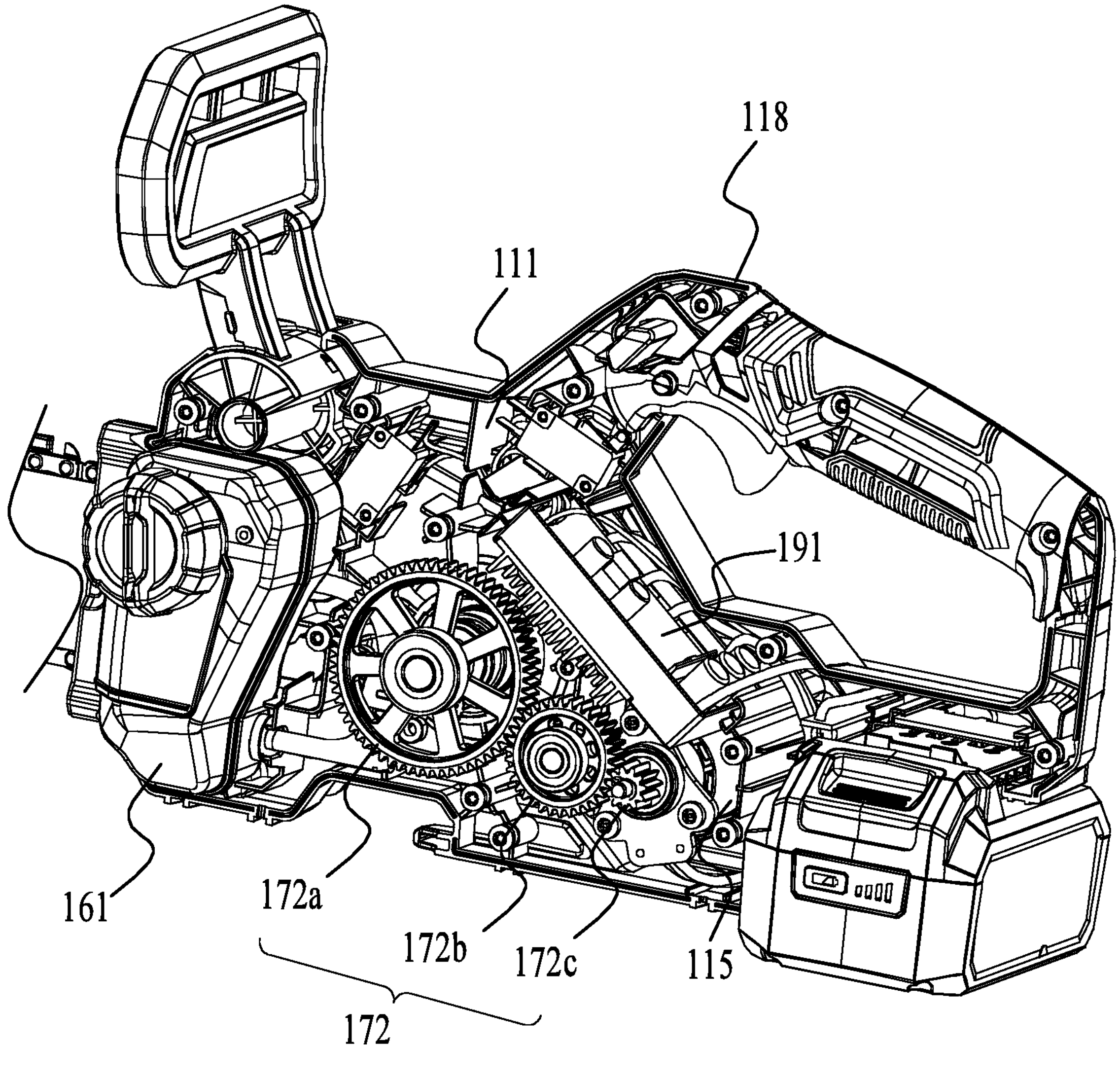
FIG. 4 is a perspective view of the chain saw in FIG. 1 with part of a housing removed.
Figure 5:
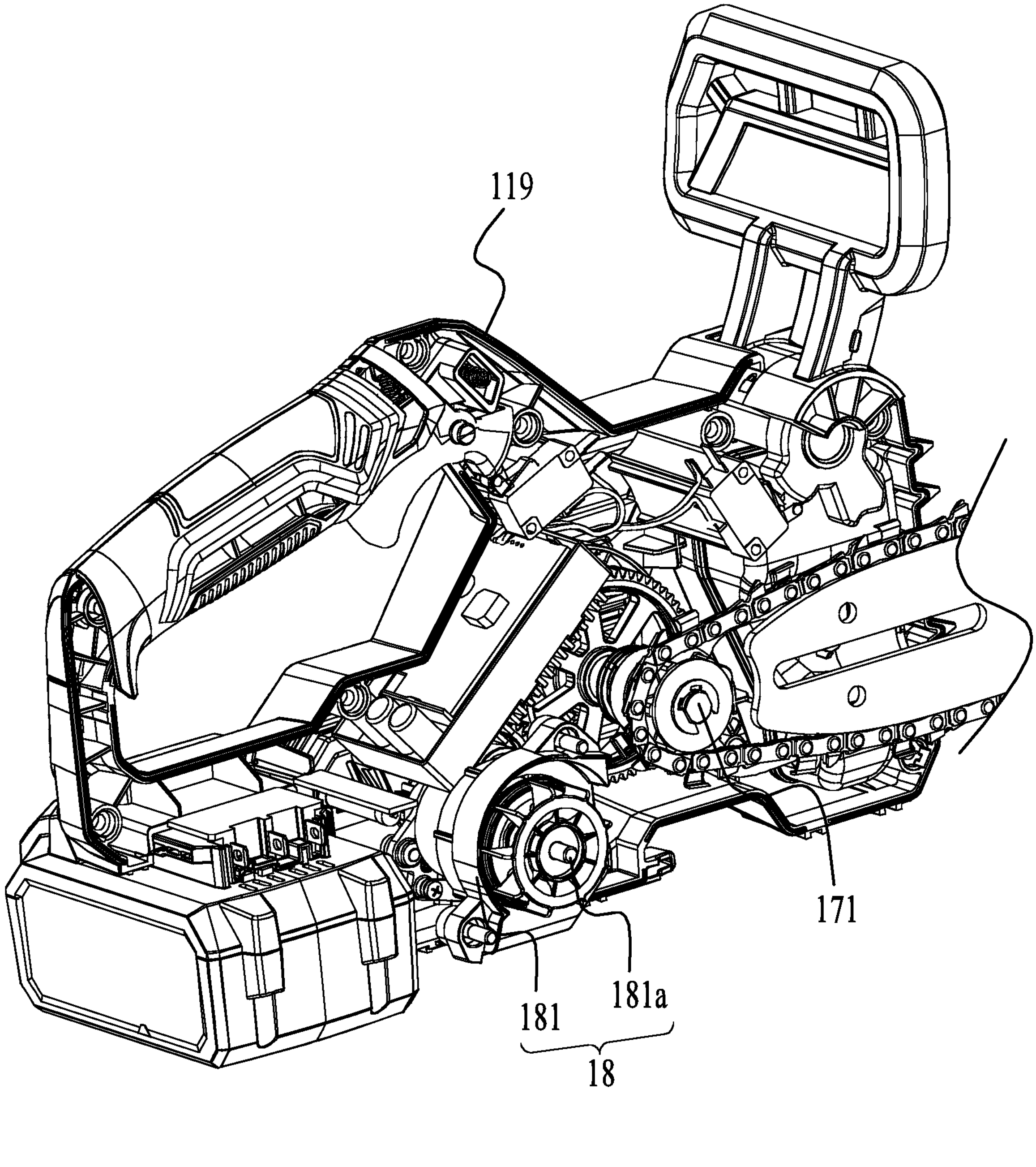
FIG. 5 is a perspective view of the chain saw in FIG. 4 from another angle of view and with part of the housing removed.
Figure 6:
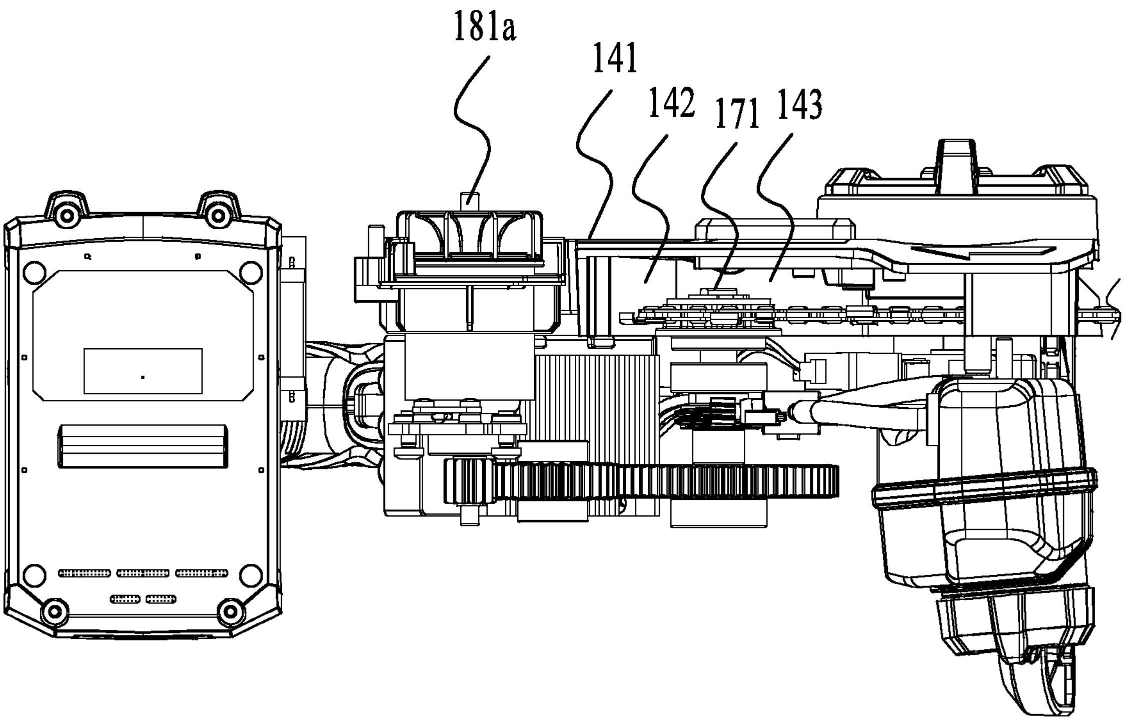
FIG. 6 is a bottom view of the chain saw in FIG. 1.

As shown in FIGS. 3 to 5, in this example, the control system 19 includes a circuit board assembly 191 disposed in the first accommodation space 111, where the circuit board assembly 191 extends in a plane. The circuit board assembly 191 is obliquely disposed in the first accommodation space 111. In an example, the circuit board assembly 191 and a first straight line 101 extending in the front and rear direction intersect obliquely with each other and are at a preset included angle. Since the transmission system 17 gradually occupies a smaller space from the front to the rear, that is, a gap between the transmission system 17 and the housing 11 is obliquely distributed, the circuit board assembly 191 makes full use of the oblique space. In an example, the circuit board assembly 191 is configured to overlap the electric motor 181 and the gearbox 173 in the up and down direction and overlap the power supply assembly 15 in the front and rear direction. That is, in a direction of a second straight line 102 perpendicular to a direction of the first straight line 101 and extending along the up and down direction, the electric motor 181 has a projection surface along the direction of the second straight line 102, where the projection surface is perpendicular to the direction of the second straight line 102, and the circuit board assembly 191 has a projection surface along the direction of the second straight line 102, where the projection surface is perpendicular to the direction of the second straight line 102; and the projection surface of the electric motor 181 along the direction of the second straight line 102 at least partially overlaps the projection surface of the circuit board assembly 191 along the direction of the second straight line 102. The transmission system 17 has a projection surface along the direction of the second straight line 102, where the projection surface is perpendicular to the direction of the second straight line 102, and the circuit board assembly 191 has the projection surface along the direction of the second straight line 102, where the projection surface is perpendicular to the direction of the second straight line 102; and the projection surface of the transmission system 17 along the direction of the second straight line 102 at least partially overlaps the projection surface of the circuit board assembly 191 along the direction of the second straight line 102. The power supply assembly 15 has a projection surface along the direction of the first straight line 101, where the projection surface is perpendicular to the direction of the first straight line 101, and the circuit board assembly 191 has a projection surface along the direction of the first straight line 101, where the projection surface is perpendicular to the direction of the first straight line 101; and the projection surface of the power supply assembly 15 along the direction of the first straight line 101 at least partially overlaps the projection surface of the circuit board assembly 191 along the direction of the first straight line 101.

To ensure effective heat dissipation on components in the housing 11, an air inlet 117 is also disposed on the housing 11. In an example, the air inlet 117 is disposed on a left side of the housing 11 and substantially in the position of the transmission system 17. When the chain saw 100 is operated, the electric motor 181 rotates to drive a cooling fan connected to the electric motor shaft 181*a* to rotate synchronously, thereby forming a negative pressure in the housing 11. In this case, an airflow flows from the air inlet 117 into the housing 11, flows through the gearbox 173, the circuit board assembly 191, and the electric motor 181 separately, and finally flows out from the air outlet 116. In this process, since the circuit board assembly 191 is obliquely disposed in the housing 11 and the circuit board assembly 191 overlaps the electric motor 181 and the gearbox 173, the heat dissipation airflow can flow through the circuit board assembly 191 and the gearbox 173 simultaneously and can flow through the circuit board assembly 191 sufficiently so that heat on the circuit board assembly 191 can be carried away to the maximum extent, thereby effectively increasing the heat dissipation efficiency of the circuit board assembly 191.

In this example, the brake system is configured to be an electronic brake, where a control loop of the electronic brake is disposed in the circuit board assembly 191, and when the electric motor 181 is controlled by a switch to stop, the electric motor 181 is braked by a counter-electromotive force generated during the running of the electric motor 181. The electronic brake is provided, which avoids an accommodation space occupied due to the use of a mechanical brake. Thus, the housing 11 does not need to form a portion for accommodating a mechanical brake assembly, thereby making the whole machine of the chain saw 100 more compact.

In this example, the housing 11 includes a first housing 118 and a second housing 119, where the first housing 118 and the second housing 119 are substantially symmetrical and are connected to each other to form the complete housing 11 and form the first accommodation space 111 and the second accommodation space 115. With the preceding arrangement, a center of gravity of the chain saw 100 in the present application can be located substantially at a joint of the first housing 118 and the second housing 119, that is, the center of gravity of the chain saw 100 can be located substantially at a center of symmetry of the whole machine in the left and right direction and in a center line of the whole machine in the front and rear direction. It is to be explained that the whole machine of the chain saw 100 here refers to a whole after the guide plate 13 and the chain 12 are removed. With the preceding arrangement, the center of gravity of the whole machine of the chain saw 100 is located substantially near the main handle 11*a* so that when the chain saw 100 is operated or is in a placed state, the chain saw 100 neither overturns nor slants, and the operation experience is excellent. In addition, since the center of gravity of the whole machine of the chain saw 100 is disposed near the main handle 11*a*, when the chain saw 100 is operated, a wrist of the user does not need to additionally output an acting force for balancing the whole machine of the chain saw 100, and it is very labor-saving for the user to operate the chain saw 100. In addition, after the guide plate 13 and the chain 12 are mounted, the center of gravity of the whole machine of the chain saw 100 is moved forward so that a portion where the chain 12 of the chain saw 100 is located can automatically droop to get close to the workpiece. Thus, when the user operates the chain saw 100, a reaction force of the workpiece to the chain 12 can be effectively counteracted so that the user does not need to output a relatively large force during a cutting process to force the chain saw 100 to cut the workpiece.

Figure 8:
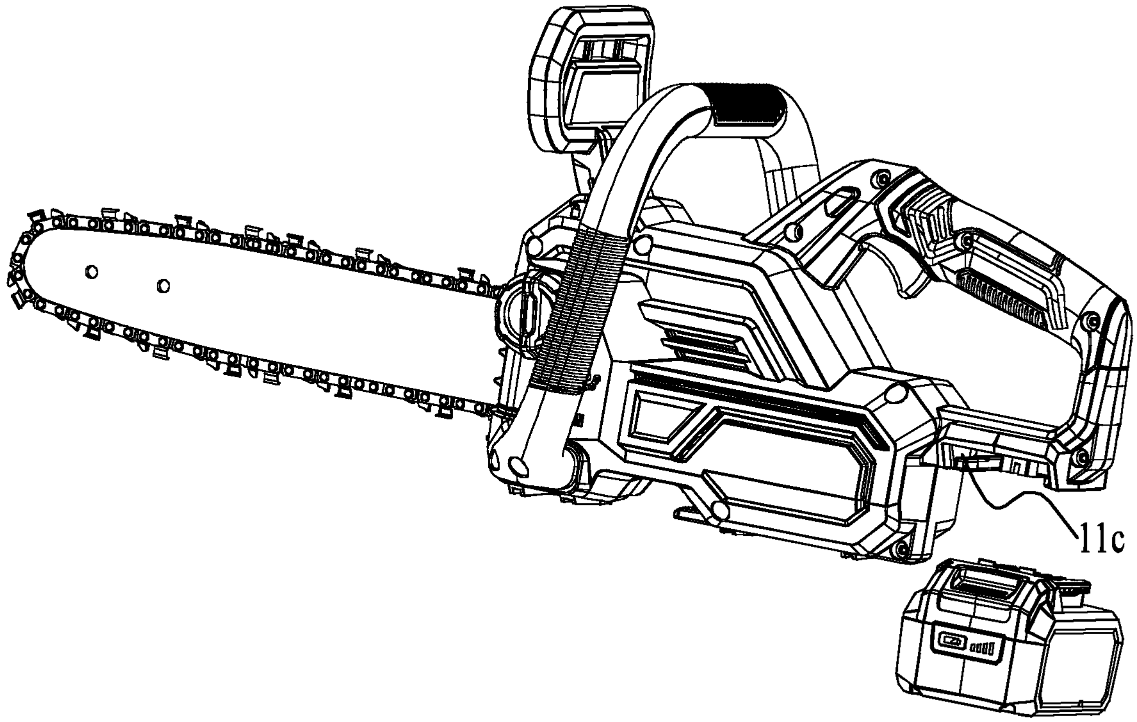
FIG. 8 is a perspective view of the chain saw in FIG. 1, where a power supply assembly is separated from a housing.

As shown in FIG. 8, in this example, the housing 11 further includes a guide slot 11*c* configured to guide the power supply assembly 15 to be mounted to the coupling portion 11*d*, where the guide slot 11*c* is disposed on a connection path along which the power supply assembly 15 is connected to the coupling portion 11*d*. The guide slot 11*c* may be separately disposed on the first housing 118 or the second housing 119 or may be disposed on both the first housing 118 and the second housing 119. Further, the guide slot 11*c* and the housing 11 may be integrally formed, or the guide slot 11*c* may be separately disposed on the housing 11. The guide slot 11*c* is further distributed along the left and right direction so that the power supply assembly 15 can be laterally inserted into the coupling portion 11*d* through the guide slot 11*c*, thereby making full use of the space on the housing 11 and below the handle. Moreover, a battery pack is laterally inserted and pulled, which can facilitate the operation of the user. In addition, since the housing 11 extends substantially along the front and rear direction, the power supply assembly 15 is configured to be laterally mounted to the coupling portion 11*d* so that the dimension of the whole machine of the chain saw 100 in a length direction can also be reduced to a certain extent. After the power supply assembly 15 is connected to the coupling portion 11*d*, a portion where the coupling portion 11*d* is located and a portion on the rear side of the housing 11 wrap the power supply assembly 15 from at least two faces so that the battery pack can be effectively protected. In other examples, the housing 11 may also be formed with multiple protection panels configured to mount and protect the power supply assembly 15. The housing 11 may be connected to or formed with 2 to 6 protection panels, thereby forming an accommodation cavity in which the power supply assembly 15 is accommodated.

What is claimed is:

1. A chain saw, comprising:

a housing extending substantially along a front and rear direction and formed with an accommodation space;

an electric motor at least partially disposed in the accommodation space;

a transmission system connected to the electric motor and capable of outputting a driving force;

a control system comprising a circuit board assembly, the circuit board assembly extending in a plane; and a power supply assembly disposed on a rear side of the housing and used for powering the electric motor;

wherein the circuit board assembly obliquely intersects with a first straight line extending along the front and rear direction; in a direction of a second straight line perpendicular to a direction of the first straight line and extending along an up and down direction, the electric motor has a first projection surface perpendicular to the direction of the second straight line and the circuit board assembly has a second projection surface perpendicular to the direction of the second straight line;

the first projection surface of the electric motor at least partially overlaps the second projection surface of the circuit board assembly;

the electric motor has a third projection surface in an upper and lower plane perpendicular to the direction of the first straight line and the circuit board assembly has a fourth projection surface in the upper and lower plane perpendicular to the direction of the first straight line;

the third projection surface of the electric motor at least partially overlaps the fourth projection surface of the circuit board assembly;

the electric motor comprises an electric motor shaft; the transmission system comprises an output shaft, a first gear connected to the output shaft, and a second gear connected to the electric motor shaft; a diameter of the second gear is smaller than a diameter of the first gear; the circuit board assembly comprises an upper end and an lower end; and the upper end is arranged on an upper side of the first gear and the lower end is arranged on an upper side of the second gear so that the circuit board assembly extends from the upper side of the first gear to the upper side of the second gear at an angle relative to the first straight line.

2. The chain saw according to claim 1, wherein in the direction of the second straight line, the transmission system has a fifth projection surface perpendicular to the direction of the second straight line; and the fifth projection surface of the transmission system at least partially overlaps the second projection surface of the circuit board assembly.

3. The chain saw according to claim 1, wherein the electric motor is an external rotor electric motor, and a ratio of a mass of the electric motor to a mass of the chain saw is greater than or equal to 0.07 and less than or equal to 0.4.

4. The chain saw according to claim 1, further comprising an oil pumping system which comprises an oil can, wherein the housing is formed with an opening communicating with an outside along both the front and rear direction and a left and right direction, and the oil can is at least partially disposed in the accommodation space and seals at least part of the opening.

5. The chain saw according to claim 4, wherein the oil pumping system, the transmission system, the electric motor, and the power supply assembly are sequentially arranged along the front and rear direction.

6. The chain saw according to claim 1, wherein the housing further comprises an air inlet and an air outlet, wherein when the chain saw is running, a heat dissipation air path flowing in from the air inlet and flowing out from the air outlet is capable of being formed, and the heat dissipation air path is capable of flowing through the transmission system and the control system simultaneously.

7. The chain saw according to claim 6, wherein the air outlet is configured to have a first blowing direction in which air is capable of being blown forward and a second blowing direction in which the air is capable of being blown backward.

8. The chain saw according to claim 1, further comprising a guide plate connected to the housing and a chain distributed around the guide plate;

wherein the output shaft is capable of driving the chain to rotate;

the chain saw further comprises a cover plate capable of sealing at least part of the guide plate and at least part of the chain, the cover plate and the housing are connected to each other and form a chip discharge space, and the output shaft is at least partially disposed in the chip discharge space; and the electric motor shaft is disposed away from the chip discharge space.

9. The chain saw according to claim 1, wherein the transmission system comprises a gearbox distributed along the front and rear direction, and the electric motor and the output shaft of the transmission system are disposed on a same side of the gearbox.

10. The chain saw according to claim 1, wherein a length of the chain saw in the front and rear direction is less than or equal to 330 mm, and a width of the chain saw in a left and right direction is less than or equal to 150 mm.

11. The chain saw according to claim 1, wherein the housing further comprises a lower bottom surface substantially perpendicular to the up and down direction, the housing is recessed away from the lower bottom surface so that a hook is formed.

12. The chain saw according to claim 1, wherein a width of the chain saw in a left and right direction is less than or equal to 150 mm.

13. The chain saw according to claim 1, further comprising an oil can, wherein the oil can is exposed on front and left sides of the housing so that the oil can is observable in both the front and rear direction and a left and right direction.

14. The chain saw according to claim 1, wherein the housing is further formed with a hook, and the hook does not protrude from a lower bottom surface of the chain saw.

15. The chain saw according to claim 1, wherein the housing is formed with a coupling portion to which the power supply assembly is mounted, the housing is further formed with a guide slot guiding the power supply assembly to be mounted to the coupling portion, the guide slot extends along a left and right direction perpendicular to the front and rear direction, and the power supply assembly is mounted to the coupling portion.

* * * * *